Aug. 30, 1960  G. W. MacDONALD  2,950,749
QUICK ATTACHABLE AND DETACHABLE COVERING FOR THE OPEN
SEATING COMPARTMENT OF CONVERTIBLE AUTOMOBILES
Filed April 20, 1959

Inventor
George W. MacDonald
by M. Talbert Dick
Attorney

Witness
Edward P. Seeley

2,950,749

QUICK ATTACHABLE AND DETACHABLE COVERING FOR THE OPEN SEATING COMPARTMENT OF CONVERTIBLE AUTOMOBILES

George W. MacDonald, 3929 Maquoketa Drive, Des Moines, Iowa

Filed Apr. 20, 1959, Ser. No. 807,429

5 Claims. (Cl. 150—52)

This invention relates to attachable and detachable coverings for the open seating compartment of convertible automobiles and more particularly to a cover that may be easily and quickly installed on the vehicle or removed therefrom.

One of the chief objections to convertible type automobiles is the task of putting the top up and down. Although most such tops are motorized, they must (in the matter of being lowered) first be unlocked, then lowered into the receiving well, then buckled into place and then covered by a snap-on cover that incloses the well compartment. To put the top up, this procedure must be reversed. While merely an occasional lowering or raising of the top is not objectionable, the fact is that the need is for most frequent lowering and raising of the top. The reason for this is that even if the convertible automobile is to set unused in the open for even a few minutes, the top should be raised. Otherwise, objectionable dust settles on the seats, and the seating compartment may well be fouled by birds. This is especially true if the vehicle is parked under a tree. Obviously, for such short parking periods, the operator will not go to the task of raising the top and then again lowering it when he returns to again use the vehicle.

Therefore, one of the principal objects of my invention is to provide a simple effective cover for the open compartment of a convertible automobile that is easily and quickly installed or removed.

A further object of this invention is to provide a lightweight cover for convertible automobiles that requires little storage room when not in actual use.

A still further object of this invention is to provide a cover for vehicles that has resilient fastening characteristics.

Still further objects of my invention are to provide a detachable cover for the open seating compartment of convertible automobiles that is durable in use, economical in manufacture, and refined in appearance.

These and other objects will be apparent to those skilled in the art.

Figure 1:
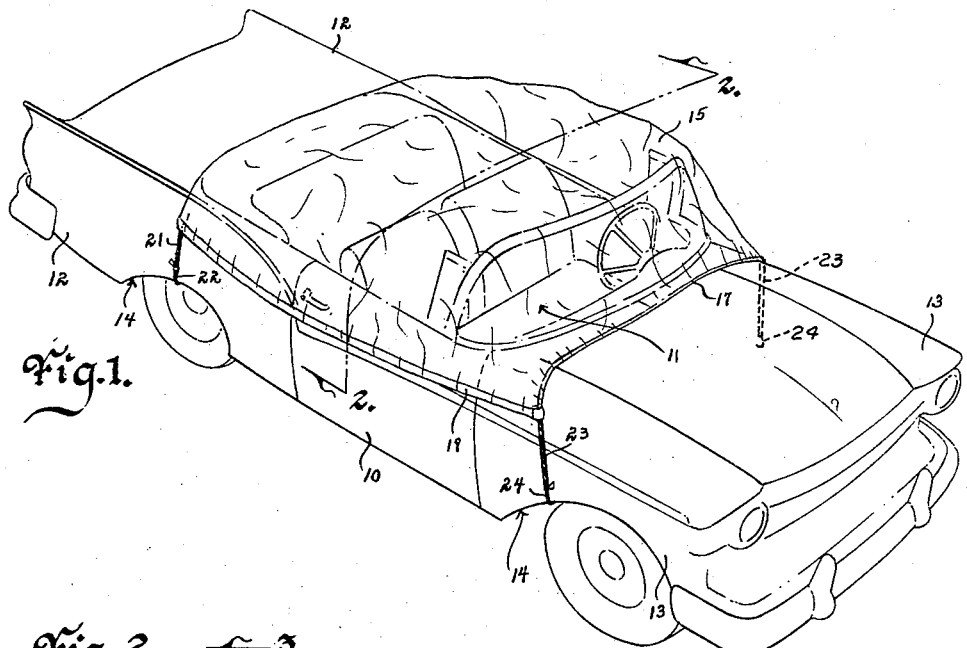
Figure 2:
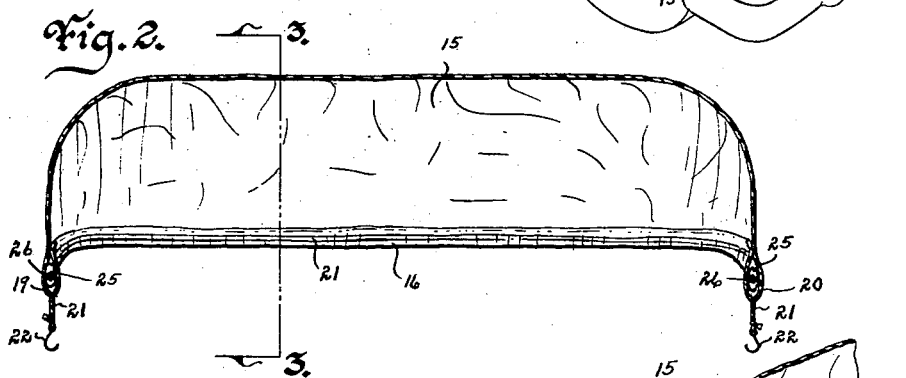
Figure 3:
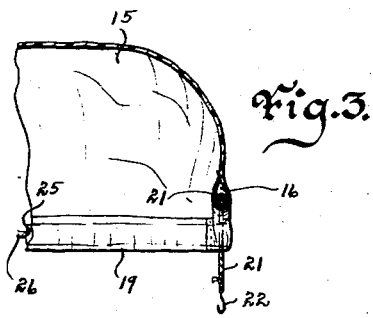
Figure 4:
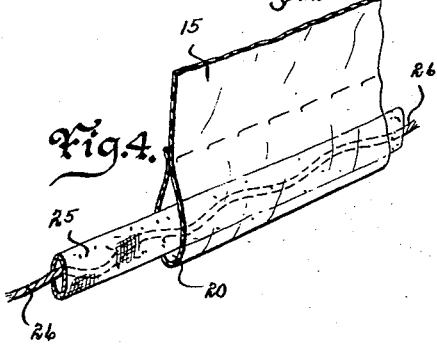

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of a convertible automobile with my cover secured thereon, Fig. 2 is a cross sectional view of my item taken on line 2—2 of Fig. 1 and more fully illustrates its construction, Fig. 3 is a longitudinal sectional view taken on line 3—3 of Fig. 2, and Fig. 4 is an enlarged perspective sectional view of one of the side portions of the cover.

In these drawings I have used the numeral 10 to generally designate a convertible automobile having the open seating compartment 11, the two rear fenders 12, and the two front fenders 13. Usually the fenders each has a concave lower rim 14 adjacent the wheel it embraces as shown in Fig. 1.

My canopy or cover is mostly made of cheap lightweight sheet plastic. The sheet portion is substantially rectangular and generally designated by the numeral 15. At the rear edge area of the sheet I provide a sleeve 16. A similar sleeve 17 is formed at the forward edge area of the sheet. A similar sleeve 19 is formed on the right side edge area of the sheet and a sleeve 20 formed on the left side edge area of the sheet. The four edge sleeves may be formed by doubling the edge areas of the sheet back upon themselves and heat sealing the extreme marginal edges to the sheet body. Also, if the sheet is of heavier material it may be sewed or glued.

The numeral 21 designates a cable loosely threaded through the rear sleeve 16 and having a hook 22 secured to each of its ends as shown in Fig. 2.

The numeral 23 designates a cable loosely threaded through the forward sleeve 17 and having a hook 24 secured to each of its ends. These cables 21 and 23 may be of flexible resilient material and the hooks 22 and 24 should be of plastic or rubber-like insulated metal so as to not damage the fenders when the device is installed thereto. When installed, the two hooks 22 will detachably hook under the rear fenders 12, respectively, and the two hooks 24 will detachably hook under the front fenders 13, respectively, as shown in Fig. 1. Loosely threaded through the right and left sleeves 19 and 20, is a flexible resilient tube 25. Each of these resilient members 25 has one end secured to the cable 21 and its other end secured to the cable 23 as shown in Fig. 3. The reason these members 25 are preferably hollow is that I pass a limiting non-stretchable rope or like 26 through each of the members 25. These ropes are of lengths considerably greater than that of the lengths of the elements 25 and are also secured at their ends to the two cables 21 and 23. By this arrangement the members 25 may be stretched a limited distance, i.e., until the slack in the ropes 26 is taken up. Thereafter, all stresses and strains will be borne by the ropes 26. The canopy portion 15 is very light and fragile and cannot stand any severe stresses or strains. Therefore, the sleeves of the canopy sheet must be most loose both transversely and longitudinally on the cables and resilient tubes 25. These resilient tubes 25 will also pull on the cables 21 and 23, and this action will hold the unit taut on the vehicle and the hooks 22 and 24 in yielding hooked positions onto the fenders of the vehicle. The canopy cover 15 will when installed completely cover the seating compartment 11 of the vehicle.

To install my device it is merely necessary to hook the hooks 22 and 24 at one side of the vehicle to the fenders on that side, then to the other side of the vehicle and hook the hooks 22 and 24 at that side under the fenders of that side. The resilience of the cables and/or tubes will yieldingly hold the hooks in position and the cover canopy in place. To remove the canopy cover it is merely necessary to unhook the hooks.

Some changes may be made in the construction and arrangement of my quick attachable and detachable covering for the open seating compartment of convertible automobiles without departing from the real spirit and purpose of my invention, and it is my intention to cover by my claims, any modified forms of structure or use of mechanical equivalents which may be reasonably included within their scope.

I claim:

1. A new article of manufacture, a substantially rectangular sheet member having sleeves extending along its four edges, the sleeves along the front and rear edges of said sheet member having elongated members extending therethrough, a hook on each end of each of said elongated members, elongated flexible resilient members extending through the sleeves along each of the side edges of said sheet member, said elongated flexible resilient members having their ends connected to said elongated members near the hooks thereon.

2. A new article of manufacture, a substantially rectangular sheet member having sleeves extending along its four edges, the sleeves along the front and rear edges of said sheet member having elongated members extending therethrough, a hook on each end of each of said elongated members, elongated flexible resilient members extending through the sleeves along each of the side edges of said sheet member, said elongated flexible resilient members having their ends connected to said elongated members near the hooks thereon, and means for limiting the stretching length of said two elongated flexible resilient members.

3. In a cover for the open seating compartment of convertible automobiles having front and rear fenders, a detachable cover, comprising, a substantially rectangular sheet member, a cable attached to one end of said sheet member, a hook member on each end of said cable adapted to detachably hook onto the two rear fenders respectively of a convertible automobile, a second cable attached to the other end of said sheet member, a hook member on each end of said second cable adapted to detachably hook onto the two front fenders of a convertible automobile, an elongated resilient member secured to one side of said sheet member having one end secured to said first mentioned cable and its other end secured to said second cable, and a second elongated resilient member secured to the other side of said sheet member having one end secured to said first mentioned cable and its other end secured to said second cable.

4. In a cover for the open seating compartment of convertible automobiles having front and rear fenders, a detachable cover, comprising, a substantially rectangular sheet member, a cable attached to one end of said sheet member, a hook member on each end of said cable adapted to detachably hook onto the two rear fenders respectively of a convertible automobile, a second cable attached to the other end of said sheet member, a hook member on each end of said second cable adapted to detachably hook onto the two front fenders of a convertible automobile, an elongated resilient member secured to one side of said sheet member having one end secured to said first mentioned cable and its other end secured to said second cable, a second elongated resilient member secured to the other side of said sheet member having one end secured to said first mentioned cable and its other end secured to said second cable; said elongated flexible members being in the form of a tube, and a rope member longitudinally loosely extending through each of said elongated flexible members and secured to both said first mentioned cable and said second cable.

5. In a cover for the open seating compartment of convertible automobiles having front and rear fenders, a detachable cover, comprising, a substantially rectangular sheet member, a cable attached to one end of said sheet member, a hook member on each end of said cable adapted to detachably hook onto the two rear fenders respectively of a convertible automobile, a second cable attached to the other end of said sheet member, a hook member on each end of said second cable adapted to detachably hook onto the two front fenders of a convertible automobile, an elongated resilient member secured to one side of said sheet member having one end secured to said first mentioned cable and its other end secured to said second cable, and a second elongated resilient member secured to the other side of said sheet member having one end secured to said first mentioned cable and its other end secured to said second cable; said first mentioned and second cables being secured to the sheet member by loosely extending through sleeves formed in the two end areas of said sheet member, and said first mentioned and second elongated resilient members being secured to the sheet member by loosely extending through sleeves formed in the two sides of said sheet member.

References Cited in the file of this patent

UNITED STATES PATENTS

| 2,570,533 | Elliott | Oct. 9, 1951 |
| 2,639,751 | Flaherty | May 26, 1953 |
| 2,716,433 | Rawlings | Aug. 30, 1955 |
| 2,801,667 | Curran | Aug. 6, 1957 |